United States Patent [19]

Russell

[11] 4,333,980

[45] Jun. 8, 1982

[54] MULTI-PLY FABRIC STRUCTURE INCLUDING INTERLINER

[75] Inventor: William M. Russell, Belchertown, Mass.

[73] Assignee: Facemate Corporation, Chicopee, Mass.

[21] Appl. No.: 40,442

[22] Filed: May 18, 1979

Related U.S. Application Data

[63] Continuation-in-part of Ser. No. 888,025, Mar. 20, 1978, abandoned.

[51] Int. Cl.$^3$ ............................................. B32B 27/14
[52] U.S. Cl. ...................................... 428/192; 2/139; 2/232; 156/202; 156/283; 156/291; 156/313; 428/193; 428/194; 428/195; 428/196; 428/198; 428/200; 428/201; 428/246
[58] Field of Search ............... 156/283, 291, 313, 202; 428/195, 196, 198, 200, 201, 206, 246, 194; 2/139, 232

[56] References Cited

U.S. PATENT DOCUMENTS

| | | | |
|---|---|---|---|
| 1,579,879 | 4/1926 | Margulies | 2/116 |
| 2,258,100 | 10/1941 | Reiso et al. | 2/243 R |
| 2,264,224 | 11/1941 | Swan | 428/246 |
| 2,299,982 | 10/1942 | Harrison | 2/269 |
| 2,435,509 | 2/1948 | Pfeffer | 2/131 |
| 2,467,438 | 4/1949 | McBurney | 2/143 |
| 2,657,159 | 10/1953 | Nahman | 2/243 R |
| 2,773,791 | 12/1956 | MacIver | 428/198 |
| 2,851,390 | 9/1958 | Chavannes | 428/198 |
| 2,957,746 | 10/1960 | Buck et al. | 2/243 R |
| 3,001,262 | 9/1961 | Parker | 28/155 |
| 3,098,235 | 7/1963 | Gusman | 428/198 |
| 3,168,749 | 2/1965 | Cula | 2/243 R |
| 3,257,663 | 6/1966 | Williamson | 156/216 |
| 3,333,280 | 8/1967 | Hynek et al. | 156/155 |
| 3,446,658 | 5/1969 | Rose | 428/198 |
| 3,914,493 | 10/1975 | Gräber | 428/198 |
| 3,922,418 | 11/1975 | Lauchenauer | 428/198 |
| 3,937,859 | 2/1976 | Carro et al. | 428/198 |
| 4,076,881 | 2/1978 | Sato | 428/198 |
| 4,143,424 | 3/1979 | Knoke et al. | 428/198 |

FOREIGN PATENT DOCUMENTS 665874  1/1952  United Kingdom .

*Primary Examiner*—James J. Bell
*Attorney, Agent, or Firm*—Chapin, Neal & Dempsey

[57] ABSTRACT

An improved interliner for fabric articles such as neckbands, collars, cuffs for garments such as shirts and the like. The interliner includes a fabric having a heat responsive permanent adhesive disposed on one surface and on the opposite surface another heat responsive adhesive which serves solely as a fabrication aid and acts as a temporary bonding agent. The permanent adhesive may be employed to bond the interliner to an outer face ply of fabric, thereby imparting form stability and wrinkle resistance to the article despite repeated laundering or dry cleaning. The temporary adhesive adheres to the other face ply for ease of assembly of the garment structure. Alternatively, the permanent adhesive may be used to bind the interliner to a second interliner to impart greater resilience and shape retentive qualities to the fabric structure.

12 Claims, 7 Drawing Figures

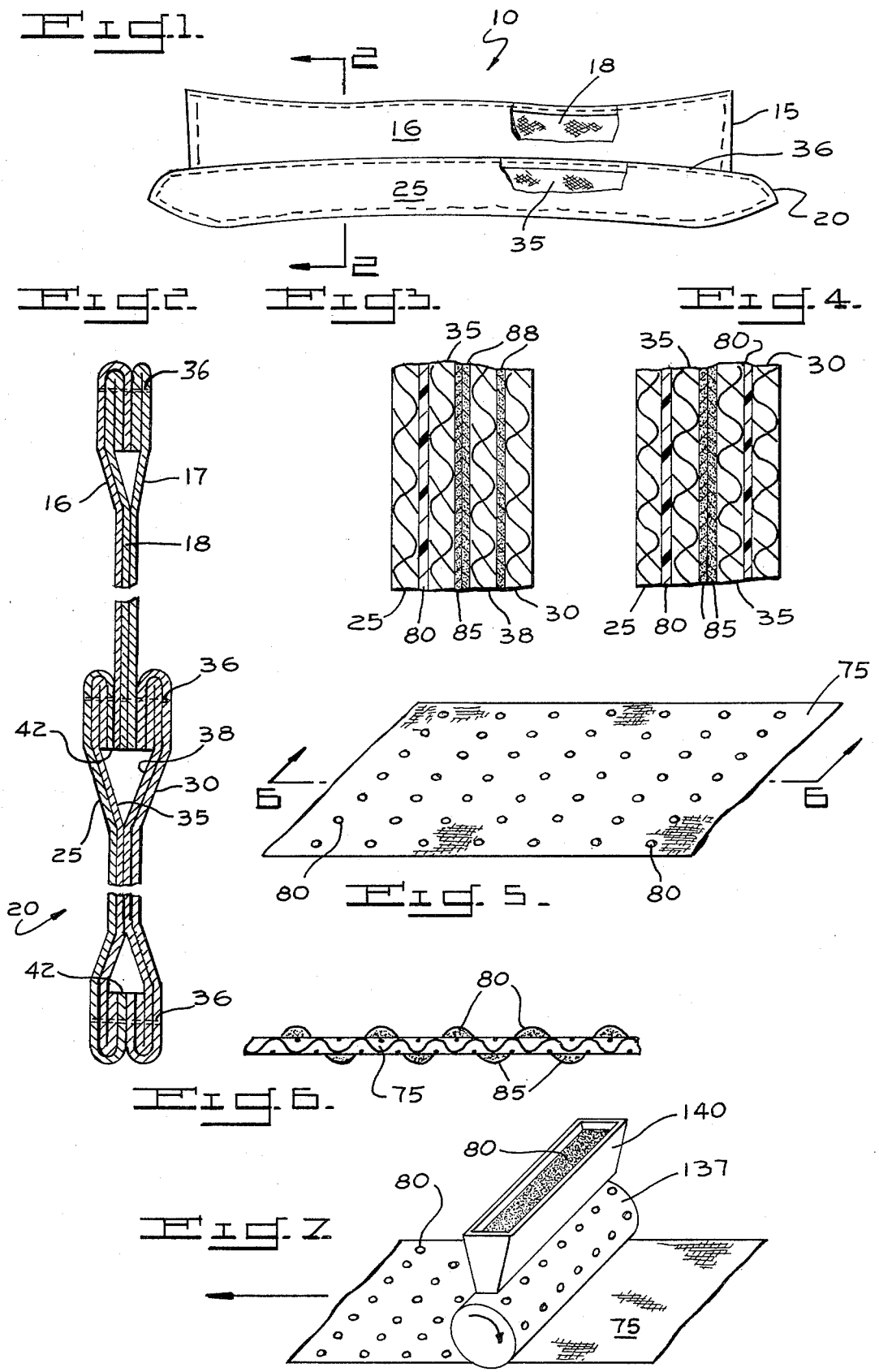

MULTI-PLY FABRIC STRUCTURE INCLUDING INTERLINER

This is a continuation-in-part of U.S. Patent Application Ser. No. 888,025, filed Mar. 20, 1978 now abandoned.

BACKGROUND

This invention relates to interliner for fabric structures such as shirt collars and cuffs.

Garments such as shirts, jackets and the like usually include shape retentive portions at the collars, cuffs and neckbands thereof. To provide the requisite shape retentively and wrinkle resistance, it has been the practice to fabricate these structures by laminating an interliner between a pair of fabrics usually called "face plies". The face plies are formed of the material from which the outside of the remainder of the garment is to be fabricated.

Prior art interliners have been of three varieties. One consists of a fabric coated either on one or both sides with a permanent type adhesive to bond the interliner to one or both of the outer fabric plies. Where the interliner fabric is coated on both surfaces with permanent adhesive, there is a tendency for the "hand" of the fabric in which this construction is employed to be excessively stiff.

While application of a permanent adhesive on only one side of the interliner may overcome the above disadvantages, there are fabrication drawbacks since during the stitching operation only one of the face plies will be adhesively held or tacked to the interliner. This requires the use of additional stitching operations.

To facilitate garment fabrication, it has been proposed to coat both interliner surfaces with a temporary adhesive. Such interliners are disclosed in U.S. Pat. No. 3,333,280 to Hynek and, although the temporary adhesive provides an effective means for tacking the interliner to outer fabric plies, once the garment is laundered or dry cleaned the adhesive bond is lost and makes no contribution to the stiffening and wrinkle resistance of the garment. Moreover, after repeated laundering or dry cleaning the collars and cuffs of such garments may exhibit severe puckering or buckling caused by a number of factors including unequal shrinkage of the face plies interliner and stitches.

Another type of interliner comprises an uncoated fabric. Having no adhesive, such interliners rely on the fabric along to impart a stiffness or resilience to the garment collar or cuff and fixtures must be employed to maintain the orientation of the interliner and outer plies during the sewing operation. Likewise, due to factors such as uneven shrinkage, after a number of launderings or dry cleanings, collars or cuffs employing such interliners exhibit severe buckling or puckering.

None of the previously available interlines possess the capabilities for permanent bonding of a face ply against one side thereof while bonding temporarily to the opposite side. Such a capability is desirable where, for example, the interliner is permanently bonded to a face ply for enhanced garment appearance and the inturned marginal edges of this two-ply laminate are temporarily bonded to the opposite side of the interliner for ease and economy of garment sewing. This capability is also required where the interliner is permanently bonded to a second interliner for a fabric structure of greater form stability and temporarily bonded to a face ply for ease and economy of manufacture where adhesive resistance to puckering or wrinkling is not required.

Accordingly, it is a principal object of the present invention to provide a garment interliner which overcomes the deficiencies of prior art interliners.

It is another object of the present invention to provide a garment collar and cuff construction in which an interliner is permanently adhesively bonded to one fabric face ply and temporarily adhesively tacked to another face ply.

It is a further object of the present invention to provide an interliner of the above type which facilitates garment manufacture as well as garment appearance and performance.

DESCRIPTION OF THE DRAWINGS

These and other objects will become more readily apparent from the following detailed description taken in connection with the accompanying drawings, in which:

FIG. 1 is a plan view of a shirt collar of the type employing a fabric interliner, portions being broken away to show details of construction;

FIG. 2 is a sectional view taken along line 2—2 of FIG. 1;

FIG. 3 is an enlarged sectional view of a multi-ply neckband construction employing the interliner of the present invention;

FIG. 4 is a view similar to that of FIG. 3 illustrative of an alternate embodiment of a multi-ply collar or cuff construction employing the interline of the present invention;

FIG. 5 is a perspective view of the interliner of the present invention;

FIG. 6 is an enlarged sectional view taken along line 6—6 of FIG. 5; and

FIG. 7 is a schematic view of methods by which adhesive may be applied to the interliner of the present invention.

DETAILED DESCRIPTION

Referring to the drawings, a collar portion of a shirt is illustrated generally at 10 in FIG. 1 comprising a collar 15 and a neckband 20 stitched together and around its perimeter as at 36. The collar includes a pair of outer or face plies 16 and 17 with a conventional fabric interliner 18 disposed therebetween to impart a degree of form stability and resilience to the collar section. The neckband comprises a pair of face plies 25 and 30 enveloping an interliner 35 embodying this invention and a second interliner 38 (FIG. 2). The interliners may be any suitable fabric construction including knit, woven and non-woven fabrics. Any sheet material useful in garment construction may be a suitable "fabric" for use in carrying out this invention. Moreover, interliner 35 is adaptable for use in any garment structure where shape retention and resilience are desirable.

Collar section 15 may be fabricated by conventional methods and thereafter sewn to the neckband 20 by stitches 36. Neckband 20 is assembled by placing face ply 25 in edge-to-edge superposed relation with interliner 35 in a two-ply laminate. The peripheral edge portions of this laminate are then folded inwardly upon itself in overlapped relation against the adjacent marginal portions of the interliner 35 as shown at 42. Ply 25 is disposed against a heat responsive permanent adhesive coating 80 (FIG. 3) on one side of interliner 35, while the overlapped marginal edge portions 42 are bondable by a temporary adhesive coating 85 on the other side of the interliner, as will hereinafter be more fully described. Of course, it will be realized that the interliner could be reversed relative to the outer ply so that the overlapped edge portions 42 would be bonded by permanent adhesive 80 while the outer ply would be bonded by temporary adhesive 85. The latter type of arrangement might be useful in three-ply structures where the interliner is disposed between two outer face plies. The second face ply 30 (FIG. 3) is similarly combined into a two-ply structure with interliner 38 which is coated on both sides with a suitable temporary tacking adhesive. Each of these two-ply structures 25/35 and 30/38 consisting of a face ply and interliner is maintained in this folded configuration by simultaneous activation of both adhesive coatings at least about the marginal edges thereof. A pair of these two-ply structures are superposed in edge-to-edge relation and with a collar part 15 are stitched together as at 36 to form the completed neckband and collar assembly of FIG. 1. By the application of heat and pressure, either before or after the stitching operation, the permanent adhesive coating 80 may be activated by energy input sufficient to permanently bond face ply 25 to interliner 35. Activation of the permanent adhesive may be overall, or in any predetermined pattern such as along the edges of the fabric structure or along spaced strips for special effects such as unidirectional stiffness.

In accordance with this invention, the interliner 35 is provided with an overall adhesive application in spaced or discontinuous deposits. On one surface, a permanent adhesive 80 is used and on the other a temporary adhesive 85. Both adhesives are heat responsive and are simultaneously activatable to a tacky adhesive condition within the same range of heat and dwell time which may vary from ¼–5 seconds. The permanent adhesive employed is further responsive to the application of a temperature substantially higher and dwell time substantially longer (5–20 seconds) than required for activating the temporary adhesive. The dwell times given are for transfer type heating and it will be recognized that other heating techniques may be employed. The significant factor in activating the two different types of adhesives is that both may be first activated to a tacky condition at one energy level while subsequently a higher quantum of energy is needed to activate the permanent adhesive.

In their tacky condition both adhesive layers serve to hold the interliner and one of the face plies in assembled relation during the manufacture of the multi-ply garment component including the inturned, overlapped edge portions, as shown at 42 in FIG. 2. The adhesive deposit on the exposed side of the interliner may also bond the interliner to a second ply or interliner for a fabric structure of enhanced stiffness and resilience. After fabrication of the multi-ply structure, the permanent adhesive may subsequently be activated at any time to permanently bond the interliner to a face ply either overall or in a selected bonding pattern to provide a wrinkle-resistant, shape-retentive garment structure.

As best seen in FIG. 3, interliner 35 composed of a fabric substrate 75, is together with interliner 38 disposed between face plies 25 and 30. The permanent type adhesive 80 disposed on one adhesive resin such as a polyethylene, polyamide, polyester or polyvinyl chloride fusible at a temperature in the range of 65°–232° C., a dwell time of 5–20 seconds, and at a suitable pressure such as 2–80 psi. As used herein "permanent adhesive" means an adhesive which is essentially unaffected by repeated laundering and/or dry cleaning, and thus will not deteriorate or lose its integrity for the life of the garment in which employed when subjected to repeated washing or dry cleaning. The permanent adhesive selected is one which is nontacky at room temperature, thereby facilitating handling including relative movement of the interliner and face plies for superposing these layers in the fabrication or assembly process. When heated to within one suitable temperature range for a brief time interval, the adhesive becomes tacky and with pressure will adhesively hold the interliner and abutting face ply together. For permanent bonding, the adhesive 80 is heated with the application of pressure to within another predetermined temperature range for a given dwell time interval whereby interliner 35 becomes permanently bonded to face ply 25 forming with the face ply a two-ply laminar structure 25/35 characterized by excellent crease resistance, shape retention and resilience through repeated washings or dry cleanings for the life of the garment in which the product is used. Any heating method may be used to activate the adhesive including heated air, heated surfaces, infrared, ultrasonics and dielectrics.

On its opposite side, interliner 35 is provided with a temporary adhesive 85 which may be any suitable resin which will soften sufficiently to adhere to a textile fabric when heated as described above. Examples of such adhesives include: polyvinyl acetate, partially acetylated and polyvinyl alcohol, polyacrylate resin, polyamide and polyethylene and copolymers thereof which will generally soften at temperatures within the range of 65°–170° C. with dwell times of ¼–5 seconds. In accordance with this invention, "temporary adhesive" comprehends an adhesive which forms a non-permanent bond and by "non-permanent bond" is meant any adhesive bond between two fabric plies which will be substantially dissipated or degraded by laundering and/or dry cleaning so that the plies are no longer united at their interface. In addition to the particular resin selected, the quantity and distribution, which may be from 0.6–9.5 gms/sq meter, applied to the fabric may also be significant. Indeed, it may be feasible to obtain a desired non-permanent bond by using in small quantities, a resin which if used in larger quantities, e.g., greater than 9.5 gm/sq meter, would provide a permanent bond.

As shown in FIGS. 2 and 3, interliners 35 and 38 are combined in a four-ply neckband assembly in which the interliner 38 is coated on opposite surfaces thereof with a temporary adhesive 88 for use as a processing aide. Where, as in a neckband for a shirt or similar garment, a permanent bond is desired between the interliner 35 and an outwardly visible face ply, interliner 35 is placed, as shown in FIGS. 2 and 3, with the permanent adhesive layer 80 disposed against the face ply 25 and temporary adhesive layer 85 placed against one side of interliner 38, coated on both sides with temporary adhesive layers 88.

The interliner of the present invention is also readily adaptable for use in garments in which a second identical interliner is combined for increased form stability and wrinkle resistance. Such use is illustrated in FIG. 4 in which two interliners 35 of the present invention are disposed in superposed relation. As shown, the permanent adhesive layers 80 of both interliners are disposed outwardly against the face plies 25 and 30 and the temporary adhesive layers 85 are disposed inwardly in abutted relation to hold the pair of two-ply liner structures together for the sewing operation.

As illustrated in FIGS. 5 and 6, the interliner of the present invention is shown generally at 35 comprising a fabric 75 with adhesives 80 and 85 applied to opposite sides of the fabric in deposits of spaced sites or dots. The coverage of the adhesive deposit for a permanent type adhesive may be in the range of 12–84 grams of adhesive per square meter of fabric for a peel strength of 12 oz/inch, the particular quantity depending upon the type of fabric, the resin and the deposition method being used.

In accordance with the present invention, the permanent adhesive may be applied by any suitable method to obtain a discontinuous application of resin on the fabric substrate. Suitable application methods include embossed film application, powder point method, sintering method, spray technique, rotary screen printing and transfer printing method.

Referring to FIG. 7, a schematic representation of powder point method, a web of interliner fabric 75 is shown being drawn to the left by any suitable drive means (not shown). The web is heated, for example, by contact with heater 135. Adhesive in granular form is deposited onto engraved roll 137 in powder form by any suitable technique such as by gravity feed from hopper 140. The roll is driven (clockwise as viewed in FIG. 7) by any suitable means (not shown), contact between the heated web 75 and the underside of engraved roll 137 causes the powdered adhesive to be deposited on the web in a predetermined dot pattern. Owing to the heating of the web, the powdered adhesive fuses to form cohesive particles which adhere to the web providing the desired dot pattern.

The temporary adhesive is also preferably deposited onto the interliner web in discontinuous application or spaced dot pattern. In this application a rotogravure process may be used wherein any of the above listed temporary adhesive materials is applied in liquid form to the side of the web opposite the permanent adhesive pattern. In accordance with such rotogravure process, the temporary adhesive is applied as a coagulated latex using an engraved roller in a manner somewhat similar to that described with respect to FIG. 7.

The following are two illustrative examples of interlinings embodying this invention and the methods of manufacture thereof:

EXAMPLE I

On one side of a woven fabric interlining, a permanent fusible coating of polyethylene resin was applied using a powder point application method. The polyethylene resin had an average grain size of 70 mesh and density of 0.940 gms/cc. On the order of 24 gms. per square meter of resin was deposited on the interliner fabric in a 25×25 staggered dot per inch pattern.

A temporary adhesive or fabrication side was then applied to the other side of the interlining using a rotogravure application method. The material used was polyvinyl acetate (pva) copolymer, applied as a 55% solids emulsion with a viscosity of 1500 cps. This coating was deposited in a discontinuous pattern with the resin deposition sites located at yarn crossover points of the interlining using an average quantity of 6 gms. per square meter.

The coated interlining was then die-cut into the shape of a shirt neckband. The interlining was then superimposed with its polyethylene side against the surface of a 65/35 polyester/cotton shirting broadcloth, also cut in neckband shape. The peripheral edges of this composite were thereafter folded over, creased, and bonded on an Ideal Creasing Machine, Model 6020, a machine manufactured by Ideal Equipment Company Limited of Montreal, Canada. Machine settings were 135° C. temperature, 40 psi pressure and 1¼ seconds dwell time. This operation caused activation of the polyethylene and polyvinyl acetate coating along the inwardly folded peripheral edges of neckband. This two-ply neckband composite was subsequently fused on a Kannegiesser Electric Press, Model HKH 450 H manufactured by Kannegiesser & Company of West Germany, at a temperature of 172° C., 40 psi pressure, and a dwell time of 12 seconds whereby the face ply was permanently bonded to the interlining by the polyethylene. The abutting faces of the folded marginal edges of the product were only temporarily adhered by the pva coating.

Neckbands so prepared were stitched to collars resulting in an even, pucker-free product. After repeated laundering, a smooth surface was maintained with excellent stiffness retention but without excessive rigidity about the edges of the product because the adhesive bonding of the pva interface degraded by laundering.

EXAMPLE II

A second heat sealable interlining was prepared using the same base interlining described in Example I. A permanent fusible coating was applied by laminating a dot embossed polyethylene film to one side of the interlining. The film used was a polyethylene film known as Delnet (registered trademark) P520 film produced by Hercules, Incorporated. The final coating was in the form of discrete dots with a staggered pattern of approximately 38×28 dots per inch in an average quantity of 29 gms. per square meter.

The fabrication aide coating was the same as used in Example I.

When tested after laundering in the manner described in Example I, excellent performance characteristics were again noted.

Interliners of the type herein described have been found to possess superior characteristics for use in the fabrication of garment components while also imparting outstanding form stability and wrinkle resistance to the completed garment component.

Having thus described the invention, what is claimed is:

1. Multi-ply fabric structure for use in fabricating garment components comprising at least one outer fabric ply and a fabric interliner having on one surface a heat responsive, permanent type adhesive and on the opposite surface a temporary fusible adhesive, the adhesive properties of which are removable by laundering, said temporary and permanent adhesives disposed at discontinuous bond sites being simultaneously activatable to a tacky condition within a first range of heat and dwell time, said outer fabric ply being superposed in generally edge-to-edge abutting relation against said interliner, outer edge portions of both said interliner and fabric ply being folded inwardly to overlapping relation against the marginal portions of said interliner, the overlapped edge and marginal portions of the interliner and fabric ply being bondable together by activation of said temporary and permanent adhesives within said first energy level range for providing temporary adhesive bonding between said overlapped edge and marginal portions of the interliner and the outer ply, said permanent adhesive being further responsive to a substantially higher energy level than said first range for permanent bonding onto one surface of said interliner.

2. Multi-ply fabric structure as set forth in claim 1 in which said temporary adhesive is selected from the group consisting of polyvinyl acetate, polyvinyl alcohol, and polyacrylate resin, and said permanent adhesive is selected from the group consisting of polyethylene, polyamide, polyester, ethylene vinyl acetate, polyacrylate, polyvinyl chlorides and copolymers thereof.

3. Multi-ply fabric structure as set forth in claim 1 wherein said outer fabric ply is disposed against one surface of the interliner and wherein the outer edge portions of the interliner and fabric ply are folded inwardly onto said opposite surface of the interliner, said outer ply being permanently bondable to said one surface of the interliner by application of substantially higher temperature and longer dwell time than used for activation within said first range.

4. Multi-ply fabric structure as set forth in claim 1 in which the permanent adhesive comprises spaced deposits of granular material and said temporary adhesive comprises spaced deposits of a coagulated latex.

5. Multi-ply fabric structure in accordance with claim 1 wherein said interliner is adhered to the abutting surface of a second superposed fabric interliner by said temporary adhesive, the other side of said second interliner being adhesively fixed to the inner surface of a second fabric ply.

6. Multi-ply fabric structure in accordance with claim 1 further including a second identical interliner superposed with said first interliner between a pair of outer fabric plies, each interliner being permanently bonded in surface-to-surface contact with one of said fabric plies and adhered together by temporary adhesive disposed on said interliners.

7. Multi-ply fabric structure in accordance with claim 1 wherein said interliner is disposed between said one and another outer fabric ply, the latter being disposed in edge-to-edge relation with the overlapped marginal portions of the interliner and said one ply, said one or the other of said outer plies being permanently bondable overall to the interliner by activation of said permanent adhesive to a substantially higher temperature and longer dwell time than the temperature and dwell time used for activation of both adhesives with said first range.

8. Multi-ply fabric structure as set forth in claim 3 wherein said outer fabric ply is permanently bondable overall to said one surface of the interliner.

9. Method of manufacturing an interliner, said method comprising the steps of
heating a continuously advancing fabric web to the softening temperature of a selected granular heat responsive adhesive resin,
depositing said adhesive resin onto one surface of said web and allowing said resin to fuse into adhesive deposits in a discontinuous layer, said adhesive resin being a permanent type resistant to laundering and dry cleaning and
applying to the opposite surface of said web in a pattern of uniformly spaced sites a heat responsive, water soluble adhesive by disposition thereof of a coagulated latex adhesive.

10. Method of manufacturing an interliner in accordance with claim 9 in which said permanent adhesive is a polyethylene and said temporary adhesive is polyvinyl acetate copolymer.

11. Method of fabricating a multi-ply garment structure which comprises the steps of superimposing at least one fabric face ply and a fabric interliner in edge-to-edge relation having on one surface thereof a heat responsive, permanent type adhesive and on the opposite surface a temporary fusible adhesive selected so that its adhesive properties will be dissipated by laundering or dry cleaning, inwardly folding the edge portions of the superposed fabrics against the marginal portions of the interliner, applying heat for a given dwell time to at least the folded and marginal portions of the interliner and face ply to cause both adhesives to become tacky so that the two folded plies will be adhesively held for further fabrication of the garment structure, thereafter applying substantially greater heat for a longer dwell time to activate the permanent adhesive thereby achieving permanent bonding between the interliner and face ply.

12. Method of fabricating a multi-ply garment structure as set forth in claim 11 wherein the permanent adhesive on said one surface is disposed against said face ply; the edge portions of the two plies being folded against the marginal portion of the opposite surface and upon activation of the permanent adhesive for said longer dwell time an overall permanent bond is formed between said one surface of the interliner and said face ply.

* * * * *